Patented Nov. 4, 1952

2,616,935

UNITED STATES PATENT OFFICE 2,616,935

DEACTIVATION OF POPCORN POLYMER WITH NITRIC ACID

Robert G. Boatright and John Fetchin, Borger, Tex., assignors to Phillips Petroleum Company, a corporation of Delaware No Drawing. Application September 22, 1947, Serial No. 775,568

6 Claims. (Cl. 260—666.5)

This invention relates to the inhibition of polymerization. In one embodiment, it relates to the inhibition of undesirable polymer formation in processing equipment. In one specific embodiment, this invention relates to the inhibition of undesirable polymer growth in equipment handling monomeric material, such as butadiene.

It is well known that monomeric materials, such as 1,3 butadiene, styrene, and the like, will polymerize to give a hard porous opaque material, insoluble in ordinary solvents such as benzene or carbon tetrachloride, and has the ability to seed itself or grow when in contact with liquid or gaseous monomeric material, which has been referred to in the art as cauliflower or sponge polymer and, more recently, this type polymer has been referred to as popcorn polymer. The term "popcorn polymer" will be used throughout this specification and claims to mean an insoluble self-propagating polymer which has the above mentioned characteristics. Popcorn polymer may be formed by the polymerization of monomeric material in which an olefinic linkage is conjugated with another olefinic linkage as in the conjugated diolefins, such as 1,3 butadiene, or by the polymerization of compounds in which the olefinic linkage is conjugated with some other type of unsaturated linkage, for example, such as the unsaturated linkage in an aromatic ring, as in styrene, or a carbon to oxygen double bond such as in methyl methacrylate. Copolymerization of the above mentioned materials will also produce the popcorn type polymer. The most remarkable property of popcorn polymer is its ability to seed itself or grow when in contact with liquid or gaseous monomeric material.

The manufacture, separation, and purification of butadiene and styrene now form the basis of the synthetic rubber industry. In plants, such as described in U. S. Patent 2,386,310 dated October 9, 1945, which issued to K. H. Hachmuth, wherein butadiene is being recovered, separated, or purified by processes which involve fractional distillation, the growth of popcorn polymer has caused a great deal of trouble. The rapid growth of popcorn polymer not only causes a loss of much valuable material but also plugs fractionators, lines, pumps, condensers and other auxiliary equipment which results in costly shutdowns of the entire plant. Furthermore, the increase in volume, which occurs when liquid or gaseous monomeric material is converted into popcorn polymer, produces excessive pressures, which are sufficient to cause the rupture of steel lines and deformation of fractionators and the like. In one instance, a nine foot diameter fractionatnig column used for purifying butadiene was removed from service and cleaned. Some small seed of popcorn polymer were accidentally left on one tray of the column. Within a few months the growth of these few minute seeds was sufficient to entirely plug the 2' x 9' diameter space between the trays of the column, and deformed the beams which supported the uppermost of the two trays. Such a mass of polymer can only be removed by manual means which in effect resemble mining operations. Furthermore, the growth of popcorn polymer has been known to rupture steel lines while they were filled with highly inflammable fluids such as butadiene. The hazards resulting from the growth of popcorn polymer are thus readily apparent.

The growth phenomenon of popcorn polymer has been studied by many investigators. One hypothesis which has been proposed is that popcorn polymer contains a large number of groups which give rise to free radicals. Such a group might be a hydroperoxide, which is formed when oxygen attacks methylene groups adjacent to an olefinic linkage. The greater the number of methylene groups in a polymer, the higher its activity as a popcorn polymer seed. Regardless of the exact reaction mechanism of popcorn polymer growth, the most compelling problem is to provide a means of inhibiting or preventing this growth. On the basis of the above hypothesis of popcorn growth it was assumed by others that an ideal deactivator would be a volatile agent which would destroy the peroxide present in the seed and prevent the formation of additional peroxides. This could be accomplished by a substance which would destroy the double bonds promoting the oxidation resulting in peroxidic groups. The deactivating material might also combine with the seed and thus inhibit reactions of the free radical type. It is known that nitrogen dioxide in dilute mixture with air is absorbed by the popcorn polymer seed which is thus rendered inactive. For effective deactivation with nitrogen dioxide the popcorn polymer seed should be dry and the temperature during the deactivation treatment should be maintained at about 175 to 200° F. Also it is known that a vapor phase treatment employing about 5 to 10 per cent nitrogen dioxide in admixture with nitrogen is effective in deactivating popcorn seed. These procedures have been tried in a commerical plant which has a capacity for producing about 56,000 tons annually of 98.0 per cent minimum purity butadiene. In this plant it is necessary to deactivate all traces of popcorn polymer seed present in a 9′ x 120′ tray fractionating column together with all auxiliary equipment including several hundred feet of pipe, condensing units, pumps, accumulators, etc. In the first trial, it was found to be impossible to maintain all of the equipment at temperatures in excess of 130° F. and therefore the deactivation of the popcorn seed was not efficient. This temperature difficulty is not encountered in the second procedure mentioned above but in this case it is necessary to either purchase or provide a special manufacturing process for the inert diluent such as nitrogen. Regardless of the efficiency of these procedures in a large commercial plant, the cost of the treatment is considerable because the nitrogen dioxide will cost up to about $2.50 per pound plus the cost of the inert diluent in the second case.

We have discovered a new process for inhibiting polymerization and deactivating popcorn polymer seed. The process involves the use of nitric acid without any special diluents or temperature control.

It is an object of this invention to provide a method for inhibiting polymerization.

Another object is to inhibit the growth of popcorn polymer.

A further object is to provide a method for deactivating popcorn polymer seed.

A further object is to provide a method for the inhibition of the formation of popcorn polymer material by the polymerization of monomeric materials.

A still further object is to provide a method of inhibiting polymerization of monomeric conjugated diolefins to produce popcorn polymer.

Another object is the inhibition of the polymerization of 1,3-butadiene to produce popcorn polymer.

Other objects and advantages of this invention will be apparent to one skilled in the art from the accompanying discussion and disclosure.

In the process of our invention the popcorn polymer seed to be deactivated is contacted with nitric acid under conditions of atmospheric temperature and pressure, however higher or lower temperatures may be used and are within the scope of this invention. The time of contact will vary from a few minutes to several hours depending upon the activity and size of the popcorn seed and other factors. Large polymer particles will require a longer contact than small polymer particles for complete deactivation.

We have found that popcorn polymer seed can be deactivated by use of nitric acid. The concentration of nitric acid used may vary over a wide range depending upon several factors, such as, the type of equipment in which the polymer is formed, activity of the polymer, contact time and the like. We have found that popcorn polymer seed in ordinary steel or iron equipment can be efficiently deactivated by use of nitric acid of about 70 per cent by weight concentration. Concentrations above 70 per cent may be used if desired but concentrations below about 70 per cent will be corrosive to the iron or steel equipment. However, in other equipment which is not attacked by dilute nitric acid, for example, glass lined equipment, concentrations of nitric acid as low as 50 per cent or lower may be used. In carrying out the process of our invention the lines, vessels, etc. may be filled with the nitric acid but it will usually be more desirable to use a much smaller quantity of acid and provide a circulating means such as a pump. When a typical fractionating column and auxiliary lines, pumps, condensers, etc., are treated for deactivation of popcorn seed, one of the auxiliary pumps, such as a reflux pump, may be used as an acid circulating means.

Before treating process equipment with nitric acid, it is desirable to remove all major accumulations, if any, of popcorn polymer. This may be done by any suitable means, such as dismantling the equipment and removing the polymer by use of picks and the like. The treating time will vary depending upon the size of the equipment, the amount of popcorn polymer seed in the equipment, quantity of acid being circulated, etc. Usually the treating time will vary from about one half hour to about four hours although a longer time may sometimes be necessary with large equipment, while a shorter time will be sufficient for small pilot plant equipment. The efficiency of the deactivation treatment may be determined by placing small quantities or control samples of active popcorn seed at selected points in the apparatus undergoing treatment. These control samples are removed and incubated in a popcorn polymer forming material, such as styrene or butadiene, and if no growth or popping of the seed occurs it may be safely assumed that all the popcorn polymer seed in the equipment has been deactivated.

There are many advantages of this new method for deactivating popcorn polymer seed. In the first place, the nitric acid used is readily available and is relatively inexpensive. It is not necessary to purchase or generate any special inert diluents such as nitrogen. The nitric acid is an effective deactivator at temperatures in the range of about 40 to about 125° F., however, higher or lower temperatures may be used advantageously in some cases, thus it is not necessary to provide any special means for maintaining super atmospheric temperature in the equipment. The popcorn polymer seed need not be dry for deactivation with nitric acid which is a significant advantage. For instance, in preparing a fractional distillation column for any type of popcorn polymer seed deactivation the usual practice is to drain the column of liquid hydrocarbon and then pass steam into the column until it is free of hydrocarbon vapors. In the "steaming out" step a portion of steam is condensed thus wetting the popcorn polymer seed. It has been found that the presence of moisture adversely affects the efficiency of nitrogen dioxide as a deactivating agent, but such is not the case with nitric acid. The pressure used in carrying out the method of our invention may vary from about atmospheric to 100 pounds per square inch or more, but usually atmospheric pressure is satisfactory.

The invention disclosed herein provides a simple and inexpensive method for inhibiting the polymerization of, and preventing the popping and growth of popcorn polymer seed in a fluid atmosphere comprising one or more compounds in which an olefinic linkage is conjugated with another similar olefinic linkage such as in the conjugated diolefins or compounds in which the olefinic linkage in conjugated with some other type of unsaturated linkage such as an unsaturated linkage in an aromatic ring.

It is to be understood that this invention should not be unnecessarily limited to the above discussion and description and that modifications and variations may be made without departing substantially from the invention or from the scope of the claims.

We claim:

1. A process for deactivating insoluble self-propagating solid polymer seed present in a butadiene fractionation zone which comprises contacting said polymer seed with nitric acid of at least 70 per cent by weight concentration at a temperature in the range between about 40 to about 125° F. and under a pressure between about atmospheric and about 100 pounds per square inch.

2. A process for the inhibition of benzene insoluble self-propagating solid polymer growth in a butadiene fractionation zone which comprises treating said fractionation zone with nitric acid of at least 70 per cent by weight concentration at a temperature in the range between about 40 to 125° F. and at a pressure in the range between about atmospheric and about 100 pounds per square inch.

3. A process for deactivating insoluble self-propagating solid polymer seed present in a monomeric conjugated diolefin fractionation zone which comprises contacting said polymer seed with nitric acid of at least 70 per cent by weight concentration at a temperature in the range of about 40 to 125° F. and under a pressure in the range between about atmospheric and about 100 pounds per square inch.

4. In a process for the production of butadiene comprising contacting butene-2 with a dehydrogenating catalyst contained in a dehydrogenating zone maintained under dehydrogenating conditions; passing the effluent from said dehydrogenating zone to a fractionation zone wherein the butadiene is removed and benzene insoluble-self-propagating solid polymer is formed, the improvement which comprises inhibiting the growth of said polymer by contacting said polymer with nitric acid of at least 70 per cent by weight concentration at a temperature in the range between about 40 and about 125° F. and under a pressure between about atmospheric and about 100 pounds per square inch.

5. A method for treating insoluble self-propagating solid polymers selected from the group consisting of butadiene, styrene, and methyl methacrylate to prevent further growth, which comprises contacting said polymers with nitric acid at a temperature between 40 and 125° F.

6. A process for inhibiting growth of a solid polymer which is benzene insoluble and self-propagating, in equipment containing an unsaturated organic monomeric material selected from the group consisting of butadiene, styrene, and methyl methacrylate which normally forms such a polymer, which comprises treating the interior of said equipment with nitric acid of at least 70 per cent by weight concentration at a temperature between 40 and 125° F.

ROBERT G. BOATRIGHT.
JOHN FETCHIN.

REFERENCES CITED

The following references are of record in the file of this patent:

UNITED STATES PATENTS

| Number | Name | Date |
|---|---|---|
| 2,136,348 | Wiley | Nov. 8, 1938 |
| 2,295,612 | Soday | Sept. 15, 1942 |
| 2,353,040 | Jones et al. | July 4, 1944 |
| 2,369,559 | Gilliland | Feb. 13, 1945 |
| 2,425,842 | Seyfried et al. | Aug. 19, 1947 |

OTHER REFERENCES

Kharasch et al., Inhibition of Polymerization, Ind. and Eng. Chem., vol. 39, No. 7 (July 1947), pp. 830–37.